(12) United States Patent
Reytier et al.

(10) Patent No.: US 9,890,860 B2
(45) Date of Patent: Feb. 13, 2018

(54) SEAL BETWEEN TWO ELEMENTS HAVING DIFFERENT COEFFICIENTS OF THERMAL EXPANSION

(75) Inventors: Magali Reytier, Villard de Lans (FR); Jacques Besson, Samois sur Seine (FR); Lionel Bruguiere, Saint Aunes (FR); Jean-François Juliaa, Montelimar (FR)

(73) Assignees: COMMISSARIAT A L'ENERGIE ATOMIQUE ET AUX ENERGIES ALTERNATIVES, Paris (FR); TECHNETICS GROUP FRANCE SAS, Saint Etenne (FR)

( * ) Notice: Subject to any disclaimer, the term of this patent is extended or adjusted under 35 U.S.C. 154(b) by 1146 days.

(21) Appl. No.: 13/501,627

(22) PCT Filed: Oct. 18, 2010

(86) PCT No.: PCT/EP2010/065649
§ 371 (c)(1),
(2), (4) Date: Jun. 27, 2012

(87) PCT Pub. No.: WO2011/048056
PCT Pub. Date: Apr. 28, 2011

(65) Prior Publication Data
US 2012/0258384 A1 Oct. 11, 2012

(30) Foreign Application Priority Data
Oct. 20, 2009 (FR) ...................................... 09 57344

(51) Int. Cl.
*H01M 8/0276* (2016.01)
*H01M 8/0282* (2016.01)
(Continued)

(52) U.S. Cl.
CPC ............. *F16J 15/0881* (2013.01); *C25B 9/00* (2013.01); *C25B 9/06* (2013.01); *H01M 8/0271* (2013.01);
(Continued)

(58) Field of Classification Search
None
See application file for complete search history.

(56) References Cited

U.S. PATENT DOCUMENTS 4,269,903 A * 5/1981 Clingman et al. ............ 428/591
6,051,330 A * 4/2000 Fasano et al. ................ 429/486
(Continued)

FOREIGN PATENT DOCUMENTS

EP 2 071 216 A1 6/2009
FR 2 925 487 A1 6/2009

OTHER PUBLICATIONS

Special Metals 2008 NPL; 16 pages total.*
(Continued)

*Primary Examiner* — Ula C Ruddock
*Assistant Examiner* — Anna Korovina
(74) *Attorney, Agent, or Firm* — Pearne & Gordon LLP

(57) ABSTRACT

The disclosure relates to a seal inserted between two elements having different coefficients of thermal expansion, the seal includes a first and a second metallic contact portion spaced along an axial stacking direction orthogonal with respect to a radial direction. Tight connection means between the first and second contact portions allow a relative movement between the first and second contact portions along the radial direction. A first and a second sliding part are respectively coupled in translation along the radial direction with the first and second contact portions and are stacked so as to be able to slide in relation to each other along the radial direction.

10 Claims, 2 Drawing Sheets

(51) Int. Cl.
*C25B 9/06* (2006.01)
*H01M 8/0271* (2016.01)
*F16J 15/08* (2006.01)
*C25B 9/00* (2006.01)
*H01M 8/124* (2016.01)

(52) U.S. Cl.
CPC ....... *H01M 8/0276* (2013.01); *H01M 8/0282* (2013.01); *H01M 2008/1293* (2013.01); *Y10S 277/936* (2013.01); *Y10S 277/939* (2013.01)

(56) References Cited

U.S. PATENT DOCUMENTS

| | | | |
|---|---|---|---|
| 7,144,651 B2* | 12/2006 | Finn et al. | 429/460 |
| 2004/0048137 A1* | 3/2004 | Chou et al. | 429/35 |
| 2004/0195782 A1* | 10/2004 | Bram et al. | 277/595 |
| 2006/0012135 A1* | 1/2006 | Chou et al. | 277/654 |
| 2006/0057295 A1* | 3/2006 | Visco et al. | 427/372.2 |
| 2006/0239765 A1 | 10/2006 | Weil et al. | |
| 2009/0155671 A1 | 6/2009 | Reytier et al. | |
| 2010/0266931 A1 | 10/2010 | Reytier et al. | |

OTHER PUBLICATIONS

Bram et al., Deformation behavior and leakage tests of alternate sealing materials for SOFC stacks, Journal of Power Sources 138 (2004) 111-119, 9 pages total.*

Chou et al., Ultra-low leak rate of hybrid compressive mica seals for solid oxide fuel cells, Journal of Power Sources, 112, 2002, 130-136; 7 pages total.*

Stevenson et al., Compressive Mica Seals for Solid Oxide Fuel Cells, JMEPEG (2006) 15:414-421, DOI: 10.1361/105994906X117215, 8 pages total.*

Wiener et al., Chemical interaction between Crofer 22 APU and mica-based gaskets under simulated SOFC conditions, J Mater Sci (2007) 42:2643-2651, DOI 10.1007/s10853-006-1355-2, 9 pages total.*

VDM Metals, VDM Aluchrom YHF, Material Data Sheet No. 4049, 7 pages total.*

International Search Report for PCT/EP2010/065649; dated Jan. 28, 2011.

* cited by examiner

SEAL BETWEEN TWO ELEMENTS HAVING DIFFERENT COEFFICIENTS OF THERMAL EXPANSION

FIELD OF THE INVENTION

The invention relates generally to a seal intended to be inserted between any two elements, having different coefficients of thermal expansion.

The present invention applies more specifically, but not exclusively, to the field of electrochemical cell systems, preferably high-temperature electrolyser, or HTE, type systems, and/or fuel cell type systems, preferably operating as high temperatures such as Solid Oxide Fuel Cells (SOFC).

STATE OF THE RELATED ART

A high-temperature steam electrolyser is intended to produce hydrogen is known. For this purpose, it comprises a plurality of stacked electrochemical cells, each cell being provided with a porous anode and a porous cathode, along with an electrolyte arranged between the anode and the cathode. Furthermore, each electrochemical cell has an associated anodic interconnector and a cathodic interconnector, connected to the anode and the cathode, respectively, and each in tight contact with the electrolyte.

On the porous cathode of the electrolyser supplied with steam, water molecule dissociation takes place. The ions migrate through the solid electrolyte, generally made of ceramics, by applying a suitable voltage, to recombine with the electrodes.

To prevent hydrogen and oxygen recombination, it is thus envisaged to seal the connection between the electrolyte and the cathodic interconnector, and the connection between the electrolyte and the anodic interconnector, simultaneously making it possible to prevent gas from leaking outside the electrolyser, and the formation of a gas mixture.

In this respect, it is noted that a substantially similar design is found on a fuel cell operating at high temperatures, given that it operates according to the reverse principle to that of the electrolyser.

To provide the abovementioned tightness, a number of constraints need to be observed, particularly the application of a weak force to clamp the seal, to avoid damaging/breaking the fragile ceramic electrolyte.

Moreover, tightness should be preserved during the temperature rise and decline phases, which represents significant difficulties due to the differential expansion phenomenon which occurs between each interconnector and the electrolyte. Indeed, during the temperature rise applied so that the system reaches the operating temperature thereof, after fitting and clamping the seal, the interconnector tends to be more deformed in the radial direction than the electrolyte. This differential expansion results, with known integral seal type solutions, in the rupture of the tightness between the seal and the interconnector, due to the relative sliding between both parts. An equivalent phenomenon occurs during the temperature decline.

This type of problem does not only apply to electrochemical cell systems, but more generally to any assembly comprising two elements having different coefficients of thermal expansion, between which a seal is inserted.

SUMMARY OF THE INVENTION

Therefore, the aim of the invention is that of remedying, at least partially, the abovementioned drawbacks, relating to prior art embodiments.

For this purpose, the invention firstly relates to a seal intended to be inserted between a first and a second element respectively made of materials having different coefficients of thermal expansion, said seal being characterised in that it comprises:

a first and a second metallic contact portion spaced along an axial stacking direction orthogonal to a radial direction of the seal, said first and second metallic portions being respectively intended to contact said first and second elements tightly;

tight connection means between said first and second metallic contact portions, allowing a relative movement between same along said radial direction; and a first and a second sliding part stacked along said axial stacking direction, and respectively coupled in translation along said radial direction with said first and second metallic contact portions between which they are inserted, so as to be able to slide in relation to each other along said radial direction.

The proposed design is characterised in that it makes it possible to maintain tightness during the temperature rise and decline phases. Indeed, during a temperature rise applied after fitting and clamping the seal, one of the two elements situated on either side of the seal tends to be more deformed than the other, in the radial direction. However, instead of sliding between the metallic contact portion and the associated element thereof, as encountered in the prior art, sliding occurs between the two sliding parts provided for this purpose in the seal core. The first and second contact portions can thus follow the deformations of the first and second elements respectively, particularly due to said suitable connection means, without sliding thereon, i.e. by retaining a tight contact. An equivalent phenomenon occurs during the temperature decline.

Moreover, it is noted that the relative movement between the first and second sliding parts is preferentially possible in all the directions of the interface plane thereof, preferably oriented orthogonally to the axial stacking direction. In this way, the relative movement may not only be made in the radial direction, but also in the orthoradial direction, i.e. the so-called tangential/circumferential direction.

Preferably, said first and second sliding parts are in contact with each other, optionally equipped with a coating favouring sliding. For the same purpose, an insert part may be inserted between the first and second sliding parts, in the axial stacking direction.

Preferably, said first and second metallic contact portions each have at least one tight contact member projecting in the axial stacking direction, outside the seal, and at least one translational coupling member projecting in the axial stacking direction, towards the inside of the seal, housed in a complementary orifice produced in the associated sliding part thereof.

Preferably, said first and second metallic contact portions are made of an Iron, Chromium and Aluminium alloy, for example the FeCrAlloy® brand.

Preferably, said first sliding part is made of an alloy comprising the element Ni in a proportion of at least 72%, Cr in a proportion between 14 and 17%, and Fe in a proportion between 6 and 10%, for example alloys belonging to the family known as Inconel® 600. This advantageously enables the first sliding part to have a coefficient of thermal expansion that is similar or identical to that of the element whose movement it is supposed to follow, if said element is made of a Nickel-based superalloy, as is generally the case for an electrochemical cell interconnector.

Preferably, said second sliding part is made of yttria-stabilised zirconia or Macor®, i.e. an easy-to-machine vitroceramic having a similar coefficient of expansion to zirconia 11.10-6 and having the following composition: SiO2 (46%), MgO (17%), Al2O3 (16%), K2O (10%), B2O3 (7%), F (4%). This advantageously enables the second sliding part to have a coefficient of thermal expansion that is similar or identical to that of the element whose movement it is supposed to follow, if said element is made of ceramics, as is generally the case for an electrochemical cell electrolyte.

Preferably, said tight connection means are made of an Iron, Chromium and Aluminium alloy, for example also the FeCrAlloy® brand. Preferentially, said connection means are made of the same material as that of the first and second contact portions.

Preferably, regardless of the preferred embodiment adopted, the seal preferentially has a substantially annular shape.

Preferably, the ratio between the thickness of the first sliding part and the thickness of the first metallic contact portion is between 2 and 5; similarly, the ratio between the thickness of the second sliding part and the thickness of the second metallic contact portion is between 2 and 5.

The invention also relates to any assembly comprising at least one seal as described above, inserted between a first and a second element respectively made of materials having different coefficients of thermal expansion, said assembly forming, for example, part of an electrochemical cell system.

Preferably, said first and second sliding parts of the seal have, respectively, coefficients of thermal expansion that are similar or identical to those of said first and second elements. Overall, this enables the seal to follow the thermal deformation of the first and second elements better, since the first and second sliding parts respectively associated therewith are deformed according to similar amplitudes. In this way, during the temperature rise and decline phases, the maintenance of tightness is thus enhanced further.

For example, the first and second elements are made of metal and ceramics, respectively, as is usually the case for electrochemical cell systems, such as high-temperature electrolysers and/or fuel cells.

In this respect, the invention also relates to an electrochemical cell system comprising at least one seal as described above. Preferably, it comprises at least one electrochemical cell provided with an anode, a cathode, and an electrolyte arranged between the anode and the cathode, an anodic interconnector and a cathodic interconnector being associated with said electrochemical cell, connected to the anode and the cathode, respectively, said system also comprising at least one seal as described above, placed between said electrolyte and the anodic interconnector, and/or between said electrolyte and the cathodic interconnector. Preferably, two separate seals are respectively provided for the two locations mentioned above.

As mentioned above, each of said first and second sliding parts preferably has a coefficient of thermal expansion that is similar or identical to that of the element, among the anodic and cathodic interconnectors and the electrolyte, with which it is associated.

Preferably, the anodic and cathodic interconnectors are metallic and the electrolyte ceramic.

As mentioned above, the system may be a high-temperature electrolyser or a high-temperature fuel cell, for example SOFC type.

Further advantages and features of the invention will emerge in the non-limitative detailed description hereinafter.

BRIEF DESCRIPTION OF THE FIGURES

This description will be made with reference to the appended figures wherein.

DETAILED DESCRIPTION OF PREFERRED EMBODIMENTS

Figure 1:
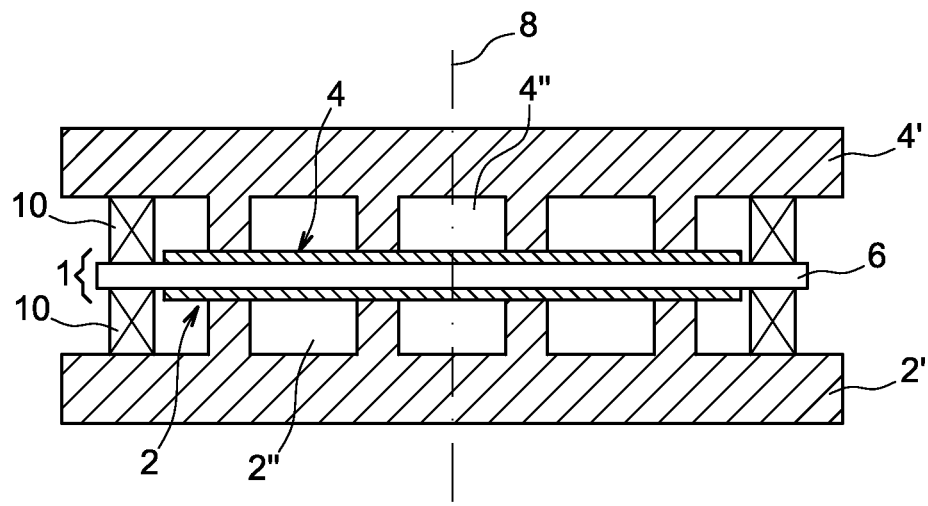
FIG. 1 represents a schematic section view of an electrochemical cell of a high-temperature electrolyser, engaging on either side with interconnectors via two seals according to the present invention.

With reference firstly to FIG. 1, an electrochemical cell 1 of a high-temperature electrolyser, preferably having a plane geometry, can be seen schematically.

The general design thereof is known, i.e. it comprises a porous anode 2, a porous cathode 4, and an electrolyte 6 arranged in contact between the anode and the cathode. These parts, preferably circular in shape, are stacked in an axial stacking direction corresponding to the axis 8 thereof.

This cell 1 has an associated anodic interconnector 2' pressing against the anode, and defining therewith an anodic chamber or compartment 2" through which the fluid can flow. Similarly, a cathodic interconnector 4' pressing against the cathode, and defining therewith a cathodic chamber or compartment 4" through which the fluid can flow, is provided.

Conventionally, the interconnectors 2', 4' are metallic, whereas the solid electrolyte is made of ceramics. More preferentially, the interconnectors may be made of a Nickel-based superalloy, for example those marketed under the brand, Haynes 230®, or made of ferritic steel, for example those marketed under a brand such as CroFer®.

To ensure the tightness of the compartments 2", 4", a seal 10 is provided between the electrolyte 6 and the interconnector 2', along with another seal 10, having an identical or similar design, between the electrolyte 6 and the interconnector 4'. These seals are preferably annular, having an axis 8, arranged on the periphery of the stack, and more specifically radially outward with respect to the anode and the cathode.

The specificity of the invention lies in the design of these seals 10, one of which will now be described by means of a preferred embodiment.

Figure 2:
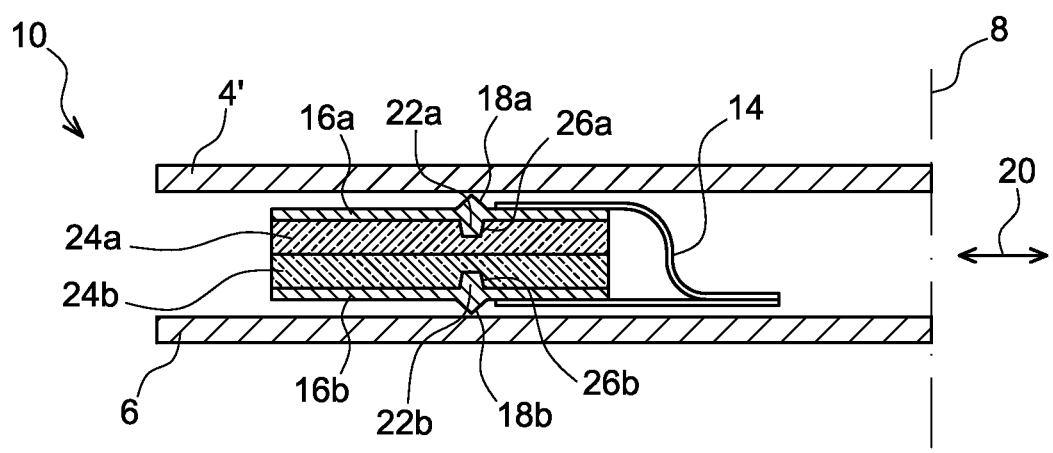
FIG. 2 represents a detailed half-section view of one of the two seals shown in FIG. 1, the seal being in the form of a preferred embodiment of the present invention, in a non-constrained design.

Firstly, with reference to FIG. 2 representing a half-section view of the seal 10, it can be seen that it has a first and a second metallic contact portion 16a, 16b, spaced along an axial stacking direction 8, orthogonal to a radial direction of the seal represented by the arrow 20. These two portions 16a, 16b are respectively intended to be in external contact with the bottom surface of the cathodic interconnector 4', and with the top surface of the electrolyte 6, the tight contacts being preferably linear, and more preferentially circular, orthogonal to the axis 8. For this purpose, each portion 16a, 16b comprises a tight contact member 18a, 18b, projecting in the axial stacking direction, outside the seal, towards the associated element 4', 6 thereof. This member may be an annular rib centered on the axis 8, or a plurality of pins distributed circumferentially about the same axis. In both cases, each tight contact member 18a, 18b has a generally tapered cross-section, in a radial plane including the axis 8, oriented towards the element 4', 6 that it is intended to contact. In this way, the most tapered part thereof, which is intended to be in contact with the associated element 4', 6 thereof, has a small cross-section in an orthogonal plane with respect to the axis 8, favouring significant compression due to plastic deformation.

Moreover, each portion 16a, 16b also comprises a translational coupling member 22a, 22b, projecting in the axial stacking direction, towards the inside of the seal. Here again, the member 22a, 22b may be an annular rib centered on the axis 8, or a plurality of pins distributed circumferentially about the same axis. Moreover, it is for example envisaged that the member 18a, 18b is situated at right angles with the member 22a, 22b situated on the same part 16a, 16b.

Each of these parts 16a, 16b is thus preferentially in the general form of a thin disk centered on the axis 8, made of an Iron, Chromium and Aluminium alloy, for example the FeCrAlloy® brand.

The portions 16a, 16b are connected to each other by tight connection means, in this case in the form of an internal structure 14 opening radially outwards, and at the end whereof the two contact portions 16a, 16b, are rigidly connected preferably by welding. The internal structure 14 displays flexibility in the radial direction 20, so as to allow a relative movement, in the same direction, between the two contact portions 16a, 16b supported. To provide this flexibility, it is preferably ensured that this annular structure 14, centered on the axis 8, has a generally C or U-shaped cross-section, opening radially outwards, as shown in FIG. 2. In this design, the base of the U or C-shape acts as a tightness barrier with respect to the other elements of the seal described hereinafter, whereas both branches bear the two contact portions 16a, 16b, respectively.

In the embodiment shown, the U or C-shape is made from two annular half-structures interconnected for example by welding or any other technique known to those skilled in the art. Nevertheless, an integral solution cannot be envisaged. Furthermore, further shapes providing such flexibility may be envisaged, without leaving the scope of the invention.

The thin internal structure 14 providing the desired flexibility may also be made of an Iron, Chromium and Aluminium alloy, for example the FeCrAlloy® brand.

One of the specific features of the present invention lies in the fitting, within the seal between the two contact portions 16a, 16b, of first and a second sliding part 24a, 24b also stacked in the axial stacking direction 8. These two parts are annular, centered on the axis 8. The part 24a is in surface contact with the bottom surface of the first contact portion 16a, whereas the part 24b is in surface contact with the top surface of the second contact portion 16b. On each of these interfaces, the translational coupling member 22a, 22b penetrates into a complementary orifice 26a, 26b, provided on the surface of the part 24a, 24b in question. This provides translational coupling, along the radial direction 20, between the first contact part 16a and the first sliding part 24a, and between the second contact part 16b and the second sliding part 24b.

Moreover, the two sliding parts 24a, 24b press against each other, preferably bearing on the orthogonal plane with respect to the axis 8, so as to be able to slide in relation to each other along the radial direction 20, and, if necessary, also along the orthoradial direction corresponding to the tangential/circumferential direction. They may be fitted with coatings favouring sliding, and are preferably in contact with each other.

If the interconnector 4' is made of a Nickel-based superalloy, the first sliding part 24a is preferentially made of the same material or of an alloy known as Inconel® 600, which is less expensive. On the other hand, if the interconnector 4' is made of ferritic steel, for example those marketed under a brand such as CroFer®, the first sliding part 24a is preferentially made of the same material.

In addition, the second sliding part 24b is made of yttria-stabilised zirconia or Macor®.

In any case, it is ensured that the first and second sliding parts of the seal have, respectively, coefficients of thermal expansion that are similar or identical to those of the interconnector 4' and the electrolyte 6, to be able to follow the thermal deformation thereof better, as detailed hereinafter.

Furthermore, the two sliding parts 24a, 24b are made in such a way as to offer the seal rigidity in the direction of the axis 8, even at high temperatures, i.e. above 500° C.

Preferably, the ratio between the thickness of the first sliding part 24a and the thickness of the first metallic contact portion 16a is between 2 and 5; similarly, the ratio between the thickness of the second sliding part 24b and the thickness of the second metallic contact portion 16b is between 2 and 5. More preferentially, the thickness of the first and second metallic contact portions 16a, 16b is as thin as possible, just limited by machining capabilities. In this case, the thickness of the elements 16a, 16b, 24a, 24b should be taken to be the mean thickness thereof in the stacking direction, apart from the regions thereof provided with projections/hollows 18a, 18b, 22a, 22b, 26a, 26b.

The method for fitting the seal 10 between the electrolyte 6 and the interconnector 4' is first initiated by the cold positioning thereof between these two elements, as represented schematically in FIG. 2. A small clearance may exist at this stage, between the seal 10 and one of the elements 4', 6.

Figure 3A:
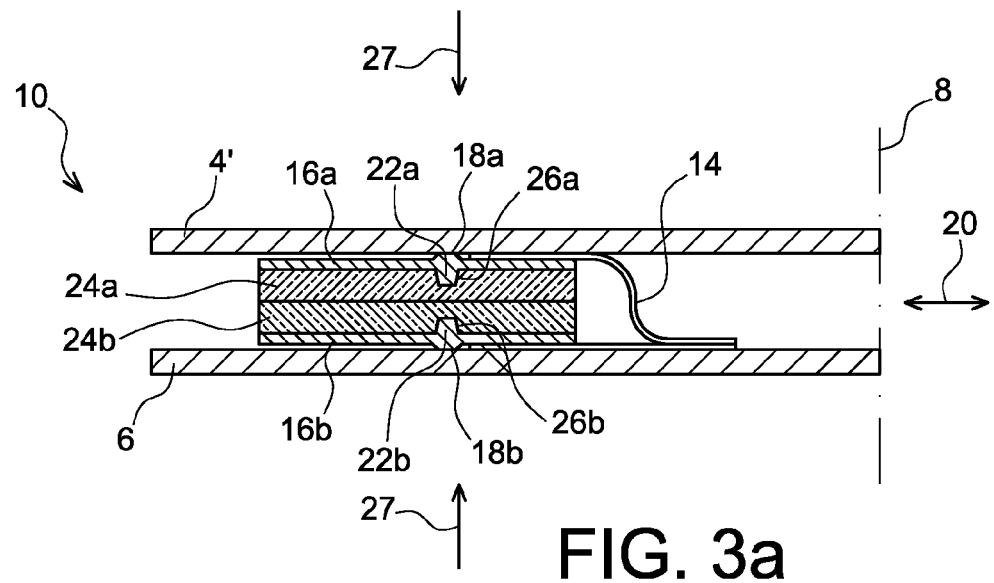
FIG. 3a represents the seal shown in the previous figure, after the clamping thereof.

A seal clamping operation is then carried out, for example at a temperature close to 20° C., or at a higher temperature. During this operation, an axial load is applied to the seal, for example by a press, as represented schematically by the arrows 27 in FIG. 3a.

During this clamping, the seal 10 is pressed against the surfaces opposite the interconnector 4' and the electrolyte 6. This compresses the tight contact members 18a, 18b against the associated elements 4', 6 thereof. This anchors the contact portions 16a, 16b in respectively the interconnector 4' and the electrolyte 6. As an indication, the pressure load applied along a circular line, at right angles with the seal, may be in the region of 3 N/mm.

The assembly, still subject to the pressure load, is then placed in a furnace and subjected to a temperature rise, so as to reach an operating temperature of the system, for example in the region of 800° C.

During this temperature rise, the various components of the assembly expand thermally, particularly in the radial direction, according to amplitudes defined by the coefficient of thermal expansion thereof.

In this way, it is known to observe a differential thermal expansion of the two elements 4', 6 in the radial direction 20, the effect of this differential expansion in the axial direction remaining negligible.

Figure 3B:
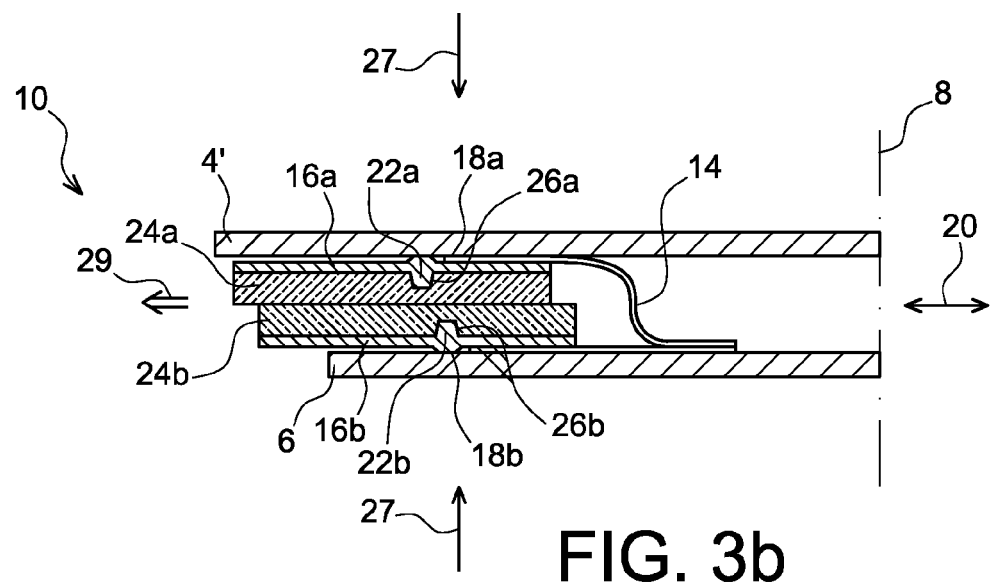
FIG. 3b represents the seal shown in the previous figure, in an expanded operating state.

More specifically, as represented schematically in a voluntarily exaggerated manner for clarity purposes in FIG. 3b, the interconnector 4' tends to move further away from the axis 8 than the electrolyte 6, as represented schematically by the arrow 29.

Nevertheless, this does not disrupt the abovementioned anchoring, since, instead of sliding between the metallic contact portions 16a, 16b and the associated element 4', 6 thereof, sliding occurs between the two sliding parts 24a, 24b provided for this purpose in the core of the seal, which are deformed respectively according to similar amplitudes to the associated elements 4', 6 thereof, due to the identical or similar coefficients of thermal expansion.

In other words, the first and second contact portions 16a, 16b follow the deformations of the interconnector 4' and the electrolyte 6 respectively, particularly due to the deformation of the flexible internal structure 14, without sliding on said elements 4', 6, i.e. by retaining the anchoring providing tightness.

The electrochemical cell system can then operate, still with the seal 10 compressed, as shown in FIG. 3b.

Finally, it is noted that the second seal 10 has a similar design to that described above, positioned in reverse manner between the anodic interconnector 2' and the electrolyte 6.

Obviously, various modifications may be made by those skilled in the art to the invention described above, merely as non-limitative examples.

The invention claimed is:

1. A system comprising:
   at least one electrochemical cell comprising an electrolyte arranged between an anode and a cathode, the at least one electrochemical cell further comprising an anodic interconnector and a cathodic interconnector connected to the anode and the cathode;
   a first seal that contacts and is inserted between the electrolyte and the anodic interconnector; and
   a second seal that contacts and is inserted between the electrolyte and the cathodic interconnector,
   wherein the first seal and the second seal each comprise:
      a first metallic contact portion and a second metallic contact portion each of which is spaced along an axial stacking direction;
      tight connection means connecting the first metallic contact portion to the second metallic contact portion, the tight connection means allowing a relative movement between the first metallic contact portion and the second metallic contact portion along a radial direction of the seal; and
      a first sliding part and a second sliding part arranged along the axial stacking direction between the first metallic contact portion and the second metallic contact portion, wherein the first sliding part and the second sliding part are respectively coupled in translation along the radial direction with the first metallic contact portion and the second metallic contact portion, and wherein the first sliding part and the second sliding part are configured to slide in relation to each other along the radial direction,
   wherein the electrolyte has a different coefficient of thermal expansion than the anodic interconnector and the cathodic interconnector,
   wherein, with respect to the first seal, a corresponding first sliding part has a coefficient of thermal expansion that is similar or identical to a coefficient of thermal expansion of the anodic interconnector, and a corresponding second sliding part has a coefficient of thermal expansion that is similar or identical to a coefficient of thermal expansion of the electrolyte,
   wherein, with respect to the second seal, a corresponding other first sliding part has a coefficient of thermal expansion that is similar or identical to a coefficient of thermal expansion of the cathodic interconnector, and a corresponding other second sliding part has a coefficient of thermal expansion that is similar or identical to the coefficient of thermal expansion of the electrolyte.

2. The system according to claim 1, wherein the first sliding part and the second sliding part are in contact with each other.

3. The system according to claim 1, wherein each of the first metallic contact portion and the second metallic contact portion comprises a corresponding at least one tight contact member, each of the corresponding at least one tight contact members projecting in the axial stacking direction towards an outside of the seal, and wherein each of the first metallic contact portion and the second metallic contact portion comprises a corresponding at least one translational coupling member, each of the corresponding at least one translational coupling members projecting in the axial stacking direction towards an inside of the seal, wherein each of the corresponding at least one translational coupling members is housed in a complementary orifice produced in a corresponding one of the first sliding part and the second sliding part.

4. The system according to claim 1, wherein the first metallic contact portion and the second metallic contact portion are made of an alloy comprising iron, chromium, and aluminum.

5. The system according to claim 1, wherein the first sliding part is made of an alloy comprising Ni in a proportion of at least 72%, Cr in a proportion between 14% and 17%, and Fe in a proportion between 6% and 10%.

6. The system according to claim 1, wherein the second sliding part is made of yttria-stabilised zirconia.

7. The system according to claim 1, wherein the tight connection means is made of a same material as the first metallic contact portion and the second metallic contact portion.

8. The system according to claim 1, wherein a ratio between a thickness of the first sliding part and a thickness of the first metallic contact portion is between 2 and 5, and wherein a ratio between a thickness of the second sliding part and a thickness of the second metallic contact portion is between 2 and 5.

9. The system according to claim 1, wherein the anodic interconnector and the cathodic interconnector are metallic and wherein the electrolyte is ceramic.

10. The system according to claim 1, wherein the at least one electrochemical cell is a high-temperature electrolyser or a high-temperature fuel cell.

* * * * *

UNITED STATES PATENT AND TRADEMARK OFFICE
CERTIFICATE OF CORRECTION

PATENT NO. : 9,890,860 B2  
APPLICATION NO. : 13/501627  
DATED : February 13, 2018  
INVENTOR(S) : Magali Reytier et al.

Page 1 of 1

It is certified that error appears in the above-identified patent and that said Letters Patent is hereby corrected as shown below:

On the Title Page

Item (73) Assignees, "Saint Etenne" should be -- Saint Etienne --.

Signed and Sealed this  
Twenty-sixth Day of March, 2019

Andrei Iancu  
*Director of the United States Patent and Trademark Office*